(12) United States Patent
Wagner et al.

(10) Patent No.: US 6,792,936 B2
(45) Date of Patent: Sep. 21, 2004

(54) BARBECUE GRILL SHELF WITH OPPOSED TOOL HANGERS

(75) Inventors: Wesley J. Wagner, Columbus, GA (US); Otha Richardson, Columbus, GA (US); Wesley Gegg, Bloomsdale, MO (US)

(73) Assignee: W. C. Bradley Company, Columbus, GA (US)

( * ) Notice: Subject to any disclaimer, the term of this patent is extended or adjusted under 35 U.S.C. 154(b) by 9 days.

(21) Appl. No.: 10/216,593

(22) Filed: Aug. 9, 2002

(65) Prior Publication Data

US 2004/0025863 A1 Feb. 12, 2004

(51) Int. Cl.[7] .............................. F24B 3/00; A47J 37/00
(52) U.S. Cl. ..................... 126/41 R; 126/25 R; 126/50; 126/332
(58) Field of Search ............................ 126/41 R, 25 R, 126/9 R, 9 B, 38, 37 B, 39 B, 50, 332, 333; 108/90, 137, 152; 248/240, 240.4, 250

(56) References Cited

U.S. PATENT DOCUMENTS

| 3,230,948 | A | * | 1/1966 | Schmitt .................... 126/25 R |
| 5,104,080 | A | | 4/1992 | Berger ......................... 248/250 |
| 5,666,941 | A | * | 9/1997 | Teufel et al. .............. 126/41 R |
| 5,887,878 | A | * | 3/1999 | Tisbo et al. ............... 280/47.19 |
| D413,229 | S | * | 8/1999 | Hopkins et al. ............. D7/406 |
| 5,941,229 | A | | 8/1999 | Schlosser et al. ......... 126/41 R |
| 6,086,073 | A | * | 7/2000 | Tisbo et al. .............. 280/47.26 |
| 6,324,998 | B1 | * | 12/2001 | Alden et al. ................... 108/90 |
| 6,354,548 | B1 | | 3/2002 | Stephen et al. .......... 248/240.4 |
| 6,606,987 | B2 | * | 8/2003 | DeMars .................... 126/41 R |

FOREIGN PATENT DOCUMENTS

JP          9-140491 A  *  6/1997

* cited by examiner

Primary Examiner—Josiah Cocks
(74) Attorney, Agent, or Firm—James W. Kayden; Thomas, Kayden, Horstemeyer & Risley, LLP

(57) ABSTRACT

A barbecue grill is disclosed that includes a main grill body including a cooking chamber, the frame, and an improved shelf. The improved shelf includes a substantially planar portion and either a pair of tool hangers configured to receive barbecue instruments and tools and/or a hand pull. The tool hangers are attached to the substantially planar portion and project therefrom in a manner wherein the tool hangers oppose each other. The hand pull is configured to be accessed by a user from under the shelf, and maybe further configured to fit user's cupped and upwardly-turned hand. Additionally, the hand pull is preferably configured to be ergonomically shaped for a user's hand.

15 Claims, 1 Drawing Sheet

BARBECUE GRILL SHELF WITH OPPOSED TOOL HANGERS

TECHNICAL FIELD

The present invention is generally related to barbecue grills and, more particularly, is related to shelves for barbecue grills.

BACKGROUND OF THE INVENTION

A shelf is a utilitarian addition to a barbecue or cooking grill, and it is well-known in the art to have a shelf as an integrated part of a grill structure, or removable therefrom. Many grills on the market are furnished with tool hangers from which barbecue instruments and/or cooking tools may be hung or attached. One problem with traditional tool hangers, however, is that the tool hangers usually project away from the shelf, thereby easily snagging objects of clothing of a barbecue grill user or scraping the user. Additionally, these tool hangers may be at eye level for some children, thereby presenting a hazard for children or animals that may be walking or playing in the vicinity of the barbecue grill.

Further, barbecue grills usually incorporate some sort of hand pull, and sometimes the hand pulls are even part of the shelf for the barbecue grill. One problem with hand pulls that are currently used on grills on the market is that the hand pull is traditionally clutched from the top, whereby the fingers of the hand are disposed in a groove or indentation in the shelf. This is uncomfortable for the user, and it is easy for the user's hand to slip, especially if the barbecue grill is wet while the hand pull is being engaged. Thus, it is desirable to have a grill that incorporates a side shelf that solves at least some of the disadvantages listed herein. A heretofore unaddressed need exists in the industry to address the aforementioned deficiencies and inadequacies.

SUMMARY OF THE INVENTION

The present invention provides a barbecue grill that includes a main grill body and a frame. Briefly described, the main grill body includes a cooking chamber, and the frame is configured to substantially correspond to the cooking chamber and to receive and support the cooking chamber. The grill further includes a shelf, the shelf being attached to the frame adjacent the cooking chamber. The shelf includes a substantially planar portion and may also include one or more tool hangers and/or a hand pull. The hanger tool or hangers are configured to receive barbecue cooking tools, wherein the tool hangers are attached to the planar portion and project therefrom in a manner wherein the tool hangers oppose each other. Preferably, each of the tool hangers includes a tabbed portion that prevents barbecue cooking instruments and tools from slipping off the tool hangers, once disposed thereon. The hand pull is configured to be accessed by a user from the underside of the shelf. Preferably, the hand pull is configured to fit a user's cupped and upwardly-turned hand, and is ergonomically shaped for a user's hand.

The present invention has numerous advantages, a few of which are delineated hereafter merely as examples. The tool hangers represent an improvement over the prior art because they do not project from the planar portion of the shelf in such a manner as to snag articles of clothing or scratch a user of the barbecue grill. Further, because the tool hangers are inwardly opposed, it eliminates the hazard of eye injury to children or animals that may be near the barbecue grill. Additionally, because the hand pull is accessed from beneath the shelf, and is ergonomically shaped for user's hand, the hand pull helps prevent slippage while the user is pulling the barbecue grill, and furthermore, it is more comfortable for a user to use.

Other advantages of the invention are that it is simple in design, user friendly, robust and reliable during use, and easily implemented for mass commercial production. Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the views.

DETAILED DESCRIPTION

Figure 1:
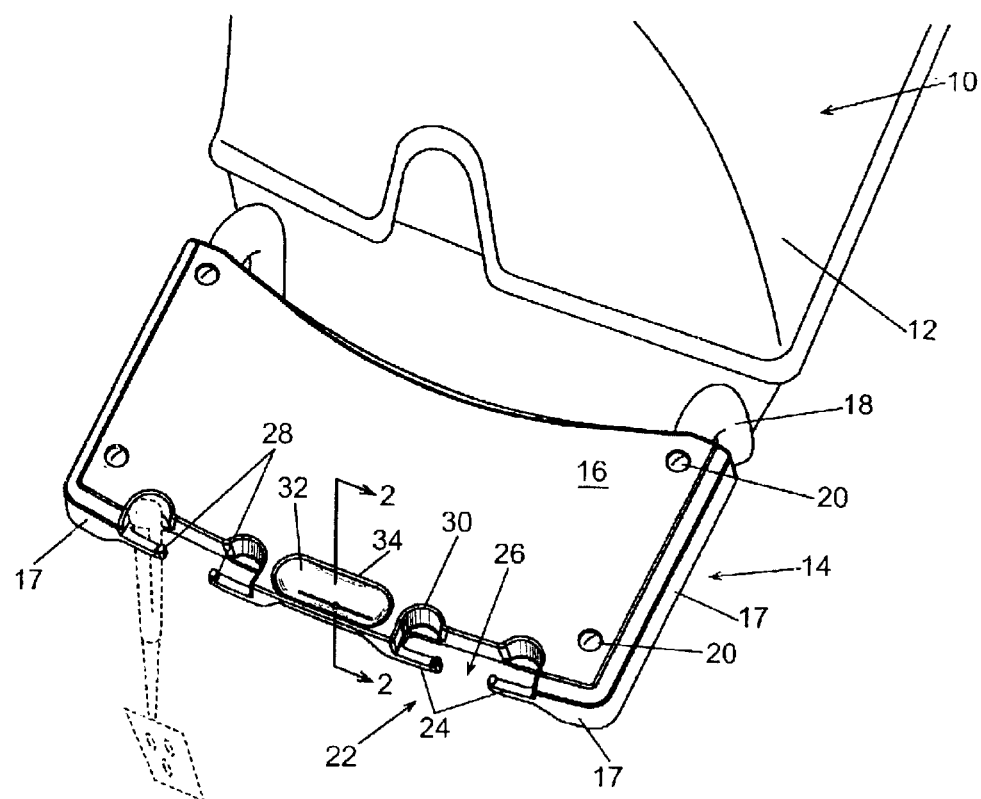
FIG. 1 is a top view of the barbecue grill side shelf of the present invention.

The barbecue grill of the present invention includes a side shelf that has improved tool hangers and hand pull. The improved tool hangers and hand pull of the side shelf of the present invention are safer and easier to use. While the invention may be embodied in different forms, there are shown in the drawings and will be described in detail hereafter preferred embodiments of the invention. Referring to FIG. 1 of the drawings, a barbecue grill 10 of the present invention includes a cooking chamber 12 (not fully shown) and a side shelf 14. The shelf 14 includes a substantially planar portion 16 with edges 17, the shelf being attached to the barbecue grill 10 via a support mechanism 18, for example, a tubular metal bar. Support mechanism 18 may be secured to the substantially planar portion 16 of shelf 14 via fastening devices 20, for example via a plastic or metal screw.

The barbecue grill shelf 14 of the present invention includes a tool hanger portion 22. The tool hanger portion 22 includes one or more tool hangers 24 and an optional opening 26 between the tool hangers. It will be understood that any number of tool hangers may be employed for purposes of the present invention. For ease of description, the context will be plural. The tool hangers are configured and arranged to receive cooking instruments and tools, and are attached to the planar portion 16 and preferably project therefrom in a manner such that the tool hangers 24 are disposed in opposition to each other. Thus, in relation to an edge 17 on shelf 14, the hanger or hangers have a hook portion and an extended portion so that the hook portion projects from edge 17 and the extended portion is substantially parallel to the edge 17 from which it projects, as opposed to outwardly, as seen in the prior art. In such a configuration, the tool hangers 24 do not touch, and have enough space 26 between them so that barbecue cooking instruments and tools can be passed between the hangers 24 and disposed between the hangers 24 and planar portion 16 of the shelf 14 (as shown via exemplary spatula in FIG. 1).

Optionally, tools may be hung from the hangers 24 via their lanyards, hooks, ropes, holes, or straps on the barbecue cooking instruments or tools. If tools are hung in such a manner from the hangers 24, it may be useful for tool hangers 24 to include tabbed portions 28 that extend upward or outward or inward from tool hangers 24, wherein the tabbed portions 28 are crooked or bent so as to prevent the barbecue cooking tools from slipping off hangers 24 once disposed thereon.

Additionally, the tool hanger portion 22 may include only the tool hangers 24, with no space 26 disposed therein (not shown). In such a case, the tool hangers 24 may touch, or overlap, and be made of a material that can be deformed by a user of the barbecue grill. In such a manner, the user can press one of the tool hangers 24 either in, out, up or down, such that there is a gap between tool hangers 24 so that a barbecue grill tool may be slipped onto one of hangers 24 or disposed between tool hangers 24 and the planar portion 16 of the shelf 14. If barbecue tools are hung so that they are disposed between the hangers 24 and the planar portion 16, the planar portion 16 may further include notched portions 30 that are adapted and configured to receive the upper end of the barbecue tool when the barbecue tool is hung thereform. For instance, some tools may be configured with an end that is enlarged or has a larger width or diameter than their base, so that they may be slipped between the hangers 24 and notched portions 30, and be supported therein.

Figure 2:
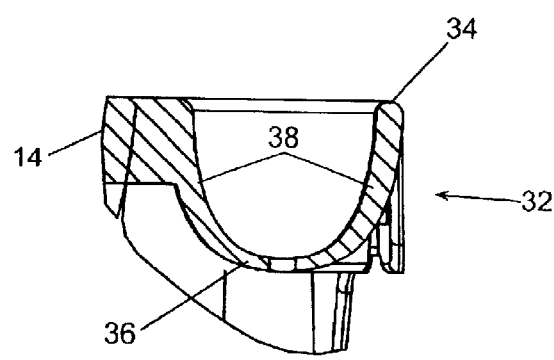
FIG. 2 is a partial cross-sectional view of the hand pull on the side shelf of FIG. 1, taken on line 2—2 of FIG. 2.

An additional advantageous feature of the shelf 14 of the present invention is the hand pull 32, which is disposed in the planar portion 16 of shelf 14, such that a lip 34 is configured around the hand pull 32. The hand pull 32 is preferably ergonomically shaped for a user's hand. The hand pull 32 is configured to be accessed by the user from the underside (not shown) of the shelf 14, and is configured to fit a user's cupped and upwardly-turned hand. As depicted in FIG. 2, the hand pull 32 includes a curved base 36, with arms 38 extending upwardly from base 36.

The barbecue grill shelf 14, with the hand pull 32 and tool hanger portions 22 can be readily configured from and formed from one solid piece of material or from several parts that are fitted together. The shelf 14 may be made of, for example, but not limited to, a metal or plastic material. In a preferred embodiment, shelf 14 is made of a polypropylene material. Preferably, the polypropylene material is compounded with 20% calcium carbonate and is UV-stabilized.

The barbecue tool hangers 24 of the present invention are advantageous because they are configured such that they do not project from the shelf 14 in such a way as to snag articles of clothing, or scratch a user of the barbecue grill. Additionally, because there are no portions of the hanger 24 that protrude from the shelf, it eliminates the risk and hazard to children and animals that may be near eye-level of the shelf Further, the hand pull 32 is advantageous in that the user may cup the hand pull 32 from beneath the barbecue grill and thereby grasp it more firmly than traditional hand pulls. The hand pull 32 may be further configured with a lid (not shown) that can prevent water or other liquids from pooling in hand pull 32. Additionally, hand pull 32 may be fitted with an aperture (not shown) at the base 36 or arms 38, which would allow liquid or rainwater to drain therefrom.

Many variations and modifications may be made to the above-described embodiment(s) of the invention without departing substantially from the spirit and principles of the invention. All such modifications and variations are intended to be included herein within the scope of the present invention.

What is claimed is:

1. A barbecue grill, comprising:
a main grill body including a cooking chamber;
a frame, wherein the frame is configured to substantially correspond to the cooking chamber and to receive and support the cooking chamber; and
a shelf, wherein the shelf is attached to the frame adjacent the cooking chamber, and wherein the shelf includes
a substantially planar portion with an edge, and
at least one tool hanger with a hook and an extended portion, the extended portion including a proximal end and a distal end the tool hanger being configured to receive barbecue cooking instruments and tools, wherein the proximal end of the tool hanger is attached to the planar portion and the tool hanger projects laterally therefrom in a manner wherein said extended portion is substantially parallel and coplanar to said edge from which it projects.

2. The grill of claim 1, wherein the shelf includes a plurality of tool hangers, configured with a space between the tool hangers sufficiently large to insert a barbecue cooking tool.

3. The grill of claim 2, wherein each of the tool hangers includes a tabbed portion disposed on the distal end of each extended portion that prevents barbecue cooking instruments and tools from slipping off the tool hangers, once disposed thereon.

4. The grill of claim 2, wherein the shelf further comprises a pair of notched portions adjacent the tool hangers, wherein the notched portions are configured to receive upper portions of tools hung from the tool hangers.

5. The grill of claim 2, wherein the plurality of tool hangers is a pair of tool hangers disposed in opposition to one another, with a space disposed therebetween.

6. The grill of claim 1, wherein the shelf further includes a hand pull.

7. The grill of claim 6, wherein the hand pull is configured to be accessed by a user from under the shelf.

8. The grill of claim 6, wherein the hand pull comprises a curved base and two arms attached to the base and extending upwardly therefrom, and wherein the hand pull is attached to an underside of the shelf.

9. The grill of claim 8, wherein the hand pull is configured to fit a user's cupped and upwardly-turned hand.

10. The grill of claim 8, wherein the hand pull is ergonomically shaped for a user's hand.

11. A barbecue grill, comprising:
a main grill body including a cooking chamber;
a frame, wherein the frame is configured to substantially correspond to the cooking chamber and to receive and support the cooking chamber; and
a shelf, wherein the shelf is attached to the frame adjacent the cooking chamber, and wherein the shelf includes
a substantially planar portion with an edge, and
a pair of tool hangers, each tool hanger with a hook, an extended portion, and a distal end, each tool hanger being configured to receive barbecue cooking instruments and tools, wherein the pair of tool hangers are disposed in opposition to one another such that the distal ends touch, wherein each of the pair of tool hangers is deformable such that a gap is formed between the distal ends by deflecting the tool hangers.

12. The grill of claim 11, wherein the gap formed between the distal ends is sufficiently large to insert a barbecue cooking tool.

13. The grill of claim 12, wherein each of the tool hangers includes a tabbed portion disposed on the distal end that prevents barbecue cooking instruments and tools from slipping off the tool hangers, once disposed thereon.

14. The grill of claim 12, wherein the shelf further comprises a pair of notched portions adjacent the tool hangers, wherein the notched portions are configured to receive upper portions of tools hung from the tool hangers.

15. The grill of claim 12, wherein the shelf further includes a hand pull.

* * * * *